(12) United States Patent
Gritsay et al.

(10) Patent No.: US 7,603,366 B1
(45) Date of Patent: Oct. 13, 2009

(54) UNIVERSAL DATABASE SCHEMA AND USE

(75) Inventors: Dmitry Gritsay, Boxborough, MA (US); Vitaly Rozenman, Shrewsbury, MA (US); Benjamin Bushoy, Newton, MA (US)

(73) Assignee: EMC Corporation, Hopkinton, MA (US)

( * ) Notice: Subject to any disclaimer, the term of this patent is extended or adjusted under 35 U.S.C. 154(b) by 238 days.

(21) Appl. No.: 11/528,895

(22) Filed: Sep. 27, 2006

(51) Int. Cl.
*G06F 17/30* (2006.01)
*G06F 15/16* (2006.01)

(52) U.S. Cl. .............. 707/100; 707/104.1; 709/224
(58) Field of Classification Search ............. 707/100, 707/104.1; 709/224
See application file for complete search history.

(56) References Cited

U.S. PATENT DOCUMENTS

| | | | | |
|---|---|---|---|---|
| 5,787,437 | A * | 7/1998 | Potterveld et al. ....... | 707/103 R |
| 6,735,591 | B2 * | 5/2004 | Khan ....................... | 707/101 |
| 2002/0065815 | A1 * | 5/2002 | Layden ..................... | 707/3 |
| 2003/0200224 | A1 * | 10/2003 | Zhang et al. ............. | 707/102 |
| 2004/0024790 | A1 * | 2/2004 | Everett ..................... | 707/100 |
| 2006/0136437 | A1 * | 6/2006 | Yamasaki ................. | 707/100 |

\* cited by examiner

*Primary Examiner*—Tony Mahmoudi
*Assistant Examiner*—Brittany N McCue
(74) *Attorney, Agent, or Firm*—Chapin IP Law, LLC; Barry W. Chapin, Esq.

(57) ABSTRACT

A database manager utilizes a same physical database schema to store attribute information associated with each of multiple resources in a storage area network environment. For example, the database manager maintains a fixed number of (or a relatively small number of) relational database tables to store information associated with any of multiple types of storage area network resources and corresponding attributes. The database manager uses a portion of the relational database tables (e.g., a resource type table and property type table) to store metadata such as resource types and corresponding resource attribute information. The database manager uses another portion of the relational database tables (e.g., an object instance table and one or more different data tables) to store actual data associated with storage area network resources.

14 Claims, 9 Drawing Sheets

UNIVERSAL DATABASE SCHEMA AND USE

RELATED APPLICATIONS

This application is related to U.S. patent application Ser. No. entitled "MODEL CONSOLIDATION IN A DATABASE SCHEMA," 11/529,038, filed on the same day as the present application, the entire teachings of which are incorporated herein by this reference.

BACKGROUND

Information services and data processing industries in general have rapidly expanded as a result of the need for computer systems to manage and store large amounts of data. As an example, financial service companies such as banks, mutual fund companies and the like now, more than ever before, require access to many hundreds of gigabytes or even terabytes of data and files stored in high capacity data storage systems. Other types of service companies have similar needs for data storage.

Data storage system developers have responded to the increased need for storage by integrating high capacity data storage systems, data communications devices (e.g., switches), and computer systems (e.g., host computers or servers) into so-called "storage networks" or "Storage Area Networks" (SANs.)

In general, a storage area network is a collection of data storage systems that are networked together via a switching fabric to a number of host computer systems operating as servers. The host computers access data stored in the data storage systems (of a respective storage area network) on behalf of client computers that request data from the data storage systems. For example, according to conventional applications, upon receiving a storage access request, a respective host computer in the storage area network accesses a large repository of storage through the switching fabric of the storage area network on behalf of the requesting client. Thus, via the host computer (e.g., server), a client has access to the shared storage system through the host computer. In many applications, storage area networks support hi-speed acquisitions of data so that the host servers are able to promptly retrieve and store data from the data storage system.

Conventional storage area network management applications typically include a graphical user interface (GUI) that enables a network manager to graphically manage, control, and configure various types of hardware and software resources associated with a corresponding managed storage area network. For example, one conventional storage management application generates a graphical user interface utilized by a storage administrator to graphically select, interact with, and manage local or remote devices and software processes associated with the storage area network. Based on use of the graphical user interface in combination with an input device such as a hand operated mouse and corresponding pointer displayed on a viewing screen, a storage administrator is able to manage hardware and software entities such as file systems, databases, storage devices, volumes, peripherals, network data communications devices, etc., associated with the storage area network. Consequently, a storage management station and associated management software enables a storage administrator (a person responsible for managing the storage network) to manage the storage area network and its resources.

One way of managing resources associated with the storage area network is to maintain so-called managed objects (e.g., representing storage area network resources) and store corresponding information associated with the managed objects in a respective database. In general, a managed object is a software entity that defines a corresponding hardware or software resource of the storage area network.

Each managed object in a storage area network environment can have many different associated attributes. For example, a switch resource is one type of managed object found in a storage area network. The switch has associated attribute information such as make (e.g., manufacturer), model number, software version information, etc. As mentioned above, the actual data associated with this attribute information is stored in a relational database.

One conventional way to store information associated with the different managed objects is to store the object information in tables of a relational database. According to one conventional technique, each of multiple different types of attributes associated with a given managed object (e.g., a representation of a storage area network resource) are stored in a different respective table of a relational database. Thus, the greater the number of resources and corresponding attributes in the storage area network, the greater the number of tables that will be maintained in the relational database.

Foreign keys in tables of the relational database point to one or more other tables in the relational database to form associations. Use of the foreign keys enables a database manager to identify the associations and retrieve appropriate data from the tables in the database for given managed objects. After retrieval of appropriate data, a display process displays the retrieved information associated with a respective managed object in a form suitable for viewing by a storage area network administrator.

SUMMARY

Conventional applications that support management of objects having respective object data stored in relational databases suffer from a number of deficiencies. For example, as discussed above, conventional techniques of storing object data and attribute information associated with different storage area network resources requires a complex web of many different types of tables and associations in a relational database to store different types of information. Software to manage the relational database tables and display information associated with a managed object can be equally complex and cumbersome to maintain since the structure (e.g., schema) for storing resource information in the relational database changes each time new attribute information is stored for a given resource in the storage area network environment.

As an example, assume that a given resource (e.g., storage area network resource) initially requires use of five different tables in a database to store five different respective types of attribute information associated with the given resource. Addition of a new attribute for storage in the conventional relational database as discussed above requires addition of a new table to store the new attribute information as well as appropriate pointers to link entries in the new table to other tables in the relational database. Thus, the number of tables in the relational database can constantly change as a storage area network environment evolves to include more or less resource attributes.

One drawback of storing different types of attribute information in different tables of a database according to conventional techniques is fragmentation. Fragmentation occurs as a result of storing first and second segments of data in non-contiguous storage locations, even though the segments of data happens to be of the same data type. Storing information of the same data type at different (potentially random) locations in the relational database makes it difficult to perform searches in the database.

Techniques discussed herein deviate with respect to conventional applications such as those discussed above as well as other techniques known in the prior art. For example, embodiments herein include a database manager function that maintains information in a relational database according to a common schema regardless of the type of managed object (e.g., type of resource) for which the data is being stored. In one embodiment, the database manager organizes a schema based on data types (e.g., string data, integer data, floating decimal data, numerical data, etc.) to reduce a number of overall tables stored in the relational database. Storage of information in the relational database by data type reduces the affects of fragmentation because, in such an embodiment, the database manager stores the same types of data (e.g., string data, integer data, floating decimal data, numerical data, etc.) in a given relational database table even though the given relational database table stores attribute information associated with many different types of storage area network resources. The actual data and/or associated metadata in a "common" table type (e.g., a data table such as an integer data table) can be stored in the relational database as a contiguous block of memory. The data in such a table can be easily searched because the contiguous block of memory stores the same type of data.

According to more specific embodiments herein, the database manager utilizes a same physical database schema to store attribute information associated with each of multiple resources in a storage area network environment by maintaining a fixed (or quasi-fixed) number of or a relatively small number of relational database tables to store information associated with any of multiple types of storage area network resources and corresponding attributes. That is, the relational database manager maintains metadata tables including a resource type table and a resource property table. The database manager also maintains actual data associated with storage area network resources in an object instance table as well as one or more different types of data tables.

In one embodiment, the database manager maintains a resource type table (e.g., a first table) in the relational database to store records that specify different possible types of resources in the storage area network environment. The property resource type table includes a respective entry (e.g., row) for each type of storage area network resource.

As discussed above, the database manager can maintain a resource property table. The database manager uses the resource property table (e.g., a second table) in the relational database to store records that specify property types associated with each of the different possible types of resources specified in the records of the resource type table (e.g., first table). In one embodiment, the resource property table is a single table including a superset (e.g., all) of the different property types associated with the different resources specified in the resource type table. Each property type in the resource property table can include a reference to a resource in the resource type table to indicate which resource type a respective property pertains.

The database manager also maintains an object instance table. The object instance table includes records identifying the different resources actually present in the storage area network environment. Each record in the object instance table can include: i) a unique identifier associated with a respective resource of the storage area network environment, and ii) a reference to an entry (e.g., record, row, etc.) in the resource type table identifying a resource type associated with the respective resource.

Additionally, the database manager can maintain one or more data tables (e.g., an integer data table, a binary data table, a floating decimal data table, a character string data table, etc.) in the relational database to store data for the property types (e.g., attributes) specified in the second table. Each of the one or more data tables stores data of the same data type (e.g., string data, integer data, floating decimal data, numerical data, etc.) even though such data stored in a given data table is associated with different types of storage area network resources. As mentioned briefly above, one embodiment herein includes storing data by type rather than storing the data in separate tables.

In certain embodiments, the entries in the data tables include one or more references (e.g., foreign keys) to entries of other tables in the relational database. For example, in one embodiment, the records in each of the one or more data tables store respective data values and corresponding references to the property type table. These references create associations indicating a property type associated with the data values stored in the data tables.

In addition to referencing property types, each of the records in the one or more data tables can include a respective reference to a record in the resource type table. These references create associations indicating a resource type to which the data values pertain.

In addition to referencing property types and/or a resource to which the data pertains, each record in the one or more data tables can include a respective reference to a record in the object instance table. As discussed above, each record in the object instance table identifies an actual resource present in the storage area network environment. Accordingly, a respective reference in a record of a data table identifies an actual resource in the storage area network environment to which the data values pertains.

Management of information in a relational database as discussed above is advantageous over conventional techniques. For example, the above embodiments enable each resource in a storage area network to be defined using a common schema. This simplifies the code that is required to create managed objects and display object information to a user. Additionally, storage of data in a few large database tables rather than many small database tables improves search efficiency. Accordingly, managed object information can be displayed to a user more quickly.

Techniques herein are well suited for use in applications such as management of storage area network environments and related resource information as discussed herein. However, it should be noted that configurations herein are not limited to use in such applications and thus configurations herein and deviations thereof are well suited for use in other applications as well. In other words, according to one embodiment, techniques herein can be deployed to maintain any type of information in a database rather than storage area network resource information.

In addition to the embodiments discussed above, other embodiments herein include a computerized device (e.g., a host computer, workstation, etc.) configured to support maintaining resources as well as corresponding resource attribute information and/or managed object information in a relational database. In such embodiments, the computerized device includes a memory system, a processor (e.g., a processing device), a display, and an interconnect. The interconnect supports communications among the display, the processor, and the memory system. The memory system is encoded with a management application that, when executed on the processor, supports database management according to embodiments herein.

Yet other embodiments of the present application disclosed herein include software programs to perform the method embodiment and operations summarized above and disclosed in detail below in the Detailed Description section of this disclosure. More specifically, one embodiment herein includes a computer program product (e.g., a computer-readable medium). The computer program product includes computer program logic (e.g., software instructions) encoded thereon. Such computer instructions can be executed on a computerized device to facilitate database management techniques according to an embodiment herein. For example, the computer program logic, when executed on at least one processor associated with a computing system, causes the processor to perform the operations (e.g., the methods) indicated herein as embodiments of the present disclosure. Such arrangements as further disclosed herein are typically provided as software, code and/or other data structures arranged or encoded on a computer readable medium such as an optical medium (e.g., CD-ROM), floppy or hard disk, or other medium such as firmware or microcode in one or more ROM or RAM or PROM chips or as an Application Specific Integrated Circuit (ASIC). The software or firmware or other such configurations can be installed on a computerized device to cause one or more processors in the computerized device to perform the techniques explained herein.

Yet another more particular technique of the present disclosure is directed to a computer program product that includes a computer readable medium having instructions stored thereon for managing resource information according to an embodiment herein. The instructions, when carried out by a processor of a respective computer device, cause the processor to utilize a common database schema to store attribute information associated with each of multiple resources in a storage area network environment by: i) maintaining a first table in a relational database, records in the first table specifying different possible types of resources in the storage area network environment; ii) maintaining a second table in the relational database, records in the second table specifying property types associated with each of the different possible types of resources specified in the records of the first table; and iii) maintaining at least one data table in the relational database to store data for the property types specified in the second table.

Other embodiments of the present application include software programs to perform any of the method embodiment steps and operations summarized above and disclosed in detail below.

It is to be understood that the system of the present application can be embodied solely as a software program, or as a software program operating in conjunction with corresponding hardware. For example, embodiments of the present application may be implemented as a component or related component of EMC's Control Center (ECC) software application that provides graphical management functionality associated with storage area network resources. Embodiments of the present application may also be implemented in computer devices that operate the Control Center (ECC) software. Control Center software is manufactured by EMC Corporation of Hopkinton, Mass., USA.

BRIEF DESCRIPTION OF THE DRAWINGS

The foregoing and other objects, features, and advantages of the present application will be apparent from the following more particular description of preferred embodiments of the present disclosure, as illustrated in the accompanying drawings in which like reference characters refer to the same parts throughout the different views. The drawings are not necessarily to scale, with emphasis instead being placed upon illustrating the embodiments, principles and concepts.

DETAILED DESCRIPTION

According to one embodiment, a database manager function maintains information in a relational database according to a common schema regardless of the type of object (e.g., type of resource) for which the data is being stored. In such embodiments, the database manager organizes the schema based on data types (e.g., string data, integer data, floating decimal data, numerical data, etc.) to reduce a number of overall tables stored in the relational database. Storage of information in the relational database by data type reduces the affects of fragmentation because, in such a network embodiment, the database manager stores the same types of data in a given relational database table even though the given relational database table stores attribute information associated with many different types of storage area network resources. The information in a "common" table (e.g., the given relational database table storing data values such as all integer data) can be stored in the relational database as a contiguous block of memory. The data in such a table therefore can be easily searched.

Figure 1:
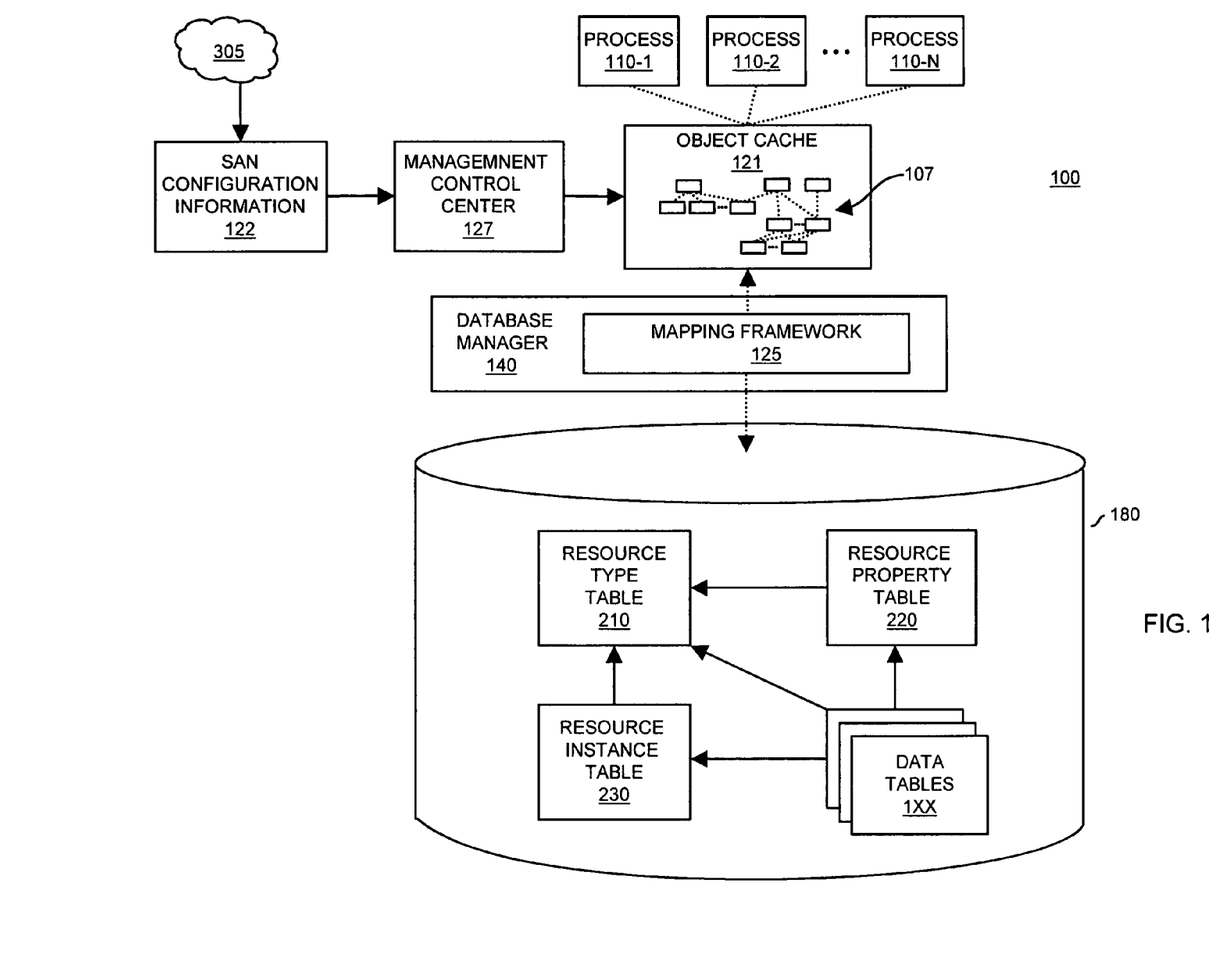
FIG. 1 is a diagram illustrating an environment for maintaining information in a relational database according to embodiments herein.

FIG. 1 is a block diagram of a storage area network environment 100 according to an embodiment herein. As shown, storage area network environment 100 includes management process 110-1, management process 110-2, . . . management process 110-N (collectively, management processes 110), management control center 127, storage area network 305, object cache 121, object hierarchy 107, database manager 140, mapping framework 125, storage area network configuration information 122, and repository 180. Repository 180 stores information in resource type table 210, resource property table 220, resource instance table 230, and data tables 240.

In general, agents in storage area network 305 collect storage area network configuration information. The management control center 127 creates managed object based on the SAN configuration information 122 received from agents distributed throughout storage area network 305. Via management control center 127, object cache 121 stores object hierarchy 107. Object hierarchy 107 includes multiple instantiated objects representing resources in the storage area network environment 100. The managed objects in object hierarchy 107 correspond to or reflect the configuration of storage area network environment 100.

Management processes 110 utilize information in the object cache 121 in order to display respective images of current configuration information associated with storage area network environment 100. For example, management processes 110 in part represents one or applications executed by network administrators. The management processes access the managed objects (e.g., resource information) in object cache 121, enabling the network administrators to view configuration information associated with storage area network environment 100.

A respective network administrator viewing the configuration images associated with the storage area network environment 100 can initiate changes to the object hierarchy 107 such as addition or deletion of one or more managed objects. Modifications to the object hierarchy 107 affect contents of repository 180 because, as mentioned above, repository 180 stores the information associated with object hierarchy 107.

Note that an actual instantiation of object hierarchies (e.g., what managed objects exist in a respective object hierarchy 107) can vary depending on how a respective storage area network is actually configured during operation. Also, note that in addition to the examples of object hierarchies discussed herein, examples of other sample managed object hierarchies associated with the storage area network can be found in related U.S. patent application Ser. No. 11/001,489 entitled "METHODS AND APPARATUS FOR DEALLOCATION OF RESOURCES," filed on Dec. 1, 2004, the entire teachings of which are incorporated herein by this reference.

Figure 2:
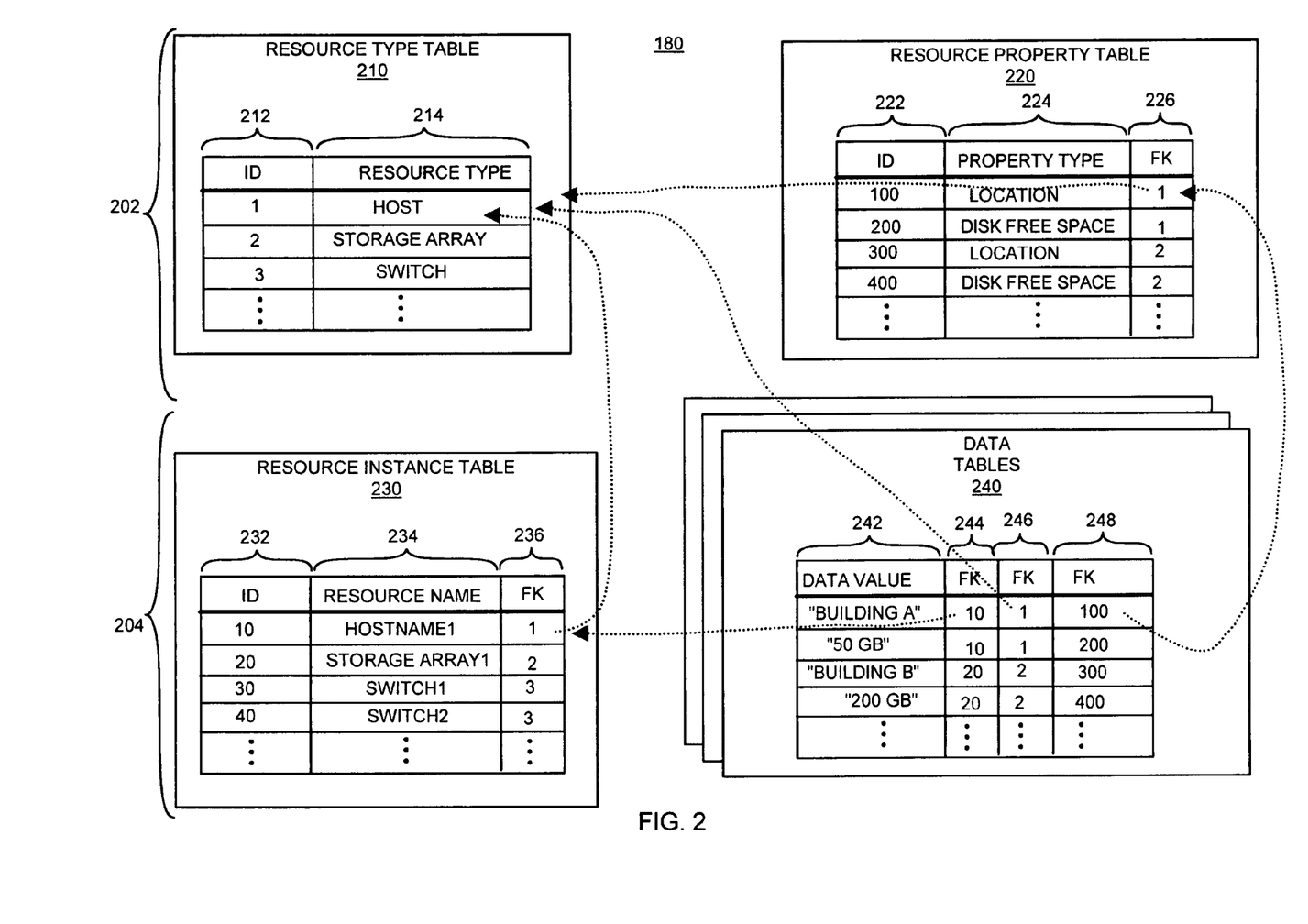
FIG. 2 is a diagram illustrating a data structure for storing information in a relational database according to an embodiment herein.

FIG. 2 is a block diagram more particularly illustrating how repository 180 stores resource information associated with storage area network environment 100 according to embodiments herein. As shown, repository 180 includes metadata tables 202 such as resource type table 210 and resource property table 220. Repository 180 stores object data 204 associated with storage area network resources in resource instance table 230 as well as one or more different types of data tables 240.

Resource type table 210 stores records that specify different possible types of resources in the storage area network environment. For example, column 212 indicates a unique identifier associated with each type of resource in the storage area network environment 100. Column 214 includes respective character strings identifying a corresponding resource type. As an example, host resources have a respective unique ID=1; storage arrays are assigned a unique ID=2; switch resources are assigned an ID=3, and so on. Although the listing is not exhaustive, additional types of resources associated with storage area network environment 100 can be found in FIG. 10. Thus, the property resource type table 210 includes a respective entry (e.g., row of information) for each type of storage area network resource.

Resource property table 220 stores records (e.g., rows) of information that specify different property types associated with each of the different possible types of resources specified in the records of the resource type table 210. In one embodiment, the resource property table 220 is a single table including a superset of all the different property types associated with the different resources specified in the resource type table. As an example, suppose that i) a first resource such as host computers (e.g., ID=1) have 8 different properties or attributes for storage in repository 180; ii) a second resource such as storage arrays (e.g., ID=2) in storage area network environment 100 have 10 different properties or attributes for storage in repository 180; iii) a third resource such as switches (e.g., ID=3) have 22 different properties or attributes for storage in repository 180; and so on. In such a case, 8 rows of resource property table 220 are dedicated for storing the 8 different property identifiers associated with host computers; 10 rows of resource property table 220 are dedicated for storing the 10 different property identifiers associated with storage arrays; 22 rows of resource property table 220 are dedicated for storing the 22 different property identifiers associated with switches; and so on.

As shown, each row in resource property table 220 includes a corresponding unique ID (e.g., an identifier as specified in column 222) associated with a respective property type or attribute. Additionally, each row in resource property table 220 includes character string information in column 224 describing the respective attribute. For example, a first row of resource property table 220 indicates that property type LOCATION is assigned a unique ID=100; a second row of resource property table 220 indicates that property type DISK FREE SPACE is assigned a unique ID=200; a third row of resource property table 220 indicates that LOCATION is assigned a unique ID=300; a fourth row of resource property table 220 indicates that DISK FREE SPACE is assigned a unique ID=400; and so on.

Each row of information in resource property table 220 also includes a respective foreign key value in column 226. The foreign keys in column 226 reference a respective resource type to which a corresponding attribute is associated. For example, the LOCATION property having a unique ID=100 includes a respective foreign key pointing to the resource type HOST. This provides an indication that the LOCATION property attribute specified in the first row of resource property table 220 pertains to host computers in storage area network environment 100. In a similar way, each of the other attributes specified in rows of resource property table 220 identify other respective resource types to which a corresponding attribute pertains.

The database manager 140 also maintains a resource instance table 230 (e.g., an object instance table). The resource instance table 230 includes records (e.g., rows or entries) identifying the different resources actually present in the storage area network environment 100. For example, each record in the resource instance table 230 includes: i) a unique identifier associated with a respective resource of the storage area network environment 100, ii) a character string of information of the unique name associated with a respective resource as identified by the unique ID, and iii) a foreign key (e.g., reference) to an entry (e.g., record, row, etc.) in the resource type table 210 identifying a resource type associated with the respective resource.

As an example, the first entry (i.e., row) in resource instance table 230 indicates that the resource named HOSTNAME1 has a corresponding unique integer ID value=10 and a respective foreign key (e.g., having a data value equal to 1) pointing to the first row of resource type table 210. This provides an indication that HOSTNAME1 is a HOST type resource. The second entry in resource instance table 230 indicates that the resource named STORAGE ARRAY1 has a corresponding unique integer ID value=20 and a respective foreign key (e.g., having a data value equal to 2) pointing to the second row of resource type table 210. This provides an indication that STORAGE ARRAY1 is a STORAGE ARRAY type resource. Thus, each entry in resource instance table 230 identifies both an actual resource in the storage area network environment 100 as well as an entry in resource type table 210 indicating a type associated with the resource.

The data tables 240 in repository 180 store data for the property types (e.g., attributes) specified in resource property table 220. Depending on the embodiment, data tables 240 can include: i) an integer data table to store integer data associated with resources in storage area network environment 100, ii) a binary data table to store binary data associated with resources in storage area network environment 100, iii) a floating decimal data table to store floating decimal data associated with resources in storage area network environment 100, iv) a character string table to store character string information associated with resources in storage area network environment 100, etc.

As mentioned above, each of the one or more data tables 240 stores data of the same data type (e.g., character string type data, integer type data, floating decimal type data, numerical data, etc.) even though the data stored in a given data table is associated with different types of storage area network resources and/or different properties associated with the storage area network resources. Thus, one embodiment herein includes storing data by type rather than storing different property or attribute information in different tables.

Each of the entries (i.e., rows) in the data tables 240 can include data values (in column 242) associated with the storage area network environment 100 as well as one or more references (e.g., foreign keys in respective column 244, column 246, and column 248) to entries of other tables in repository 180. For example, as shown in FIG. 2, data table 240 stores character string information.

The first row in data table 240 identifies that character string data value "BUILDING A" in column 242 includes a first foreign key (e.g., having a value=10) referencing an entry (e.g., to HOSTNAME1) in the resource instance table 230. This provides an indication that the data value "BUILDING A" is associated with respective HOSTNAME1.

The first row in data table 240 also identifies that character string data value "BUILDING A" in column 242 has an associated second foreign key (e.g., having a value=1) referencing a respective resource type entry (e.g., to HOST) in the resource type table 210. This provides an indication that the data value "BUILDING A" pertains to a HOST type of resource in storage area network environment 100.

The first row in data table 240 also identifies that character string data value "BUILDING A" in column 242 includes a third foreign key (e.g., having a value=100) referencing an entry (e.g., to LOCATION) in the resource property table 220. This provides an indication that the data value "BUILDING A" pertains to a LOCATION type of property in storage area network environment 100.

Additional entries in data tables 240 identify similar references to data values and corresponding foreign keys identifying an actual resource, a resource type of the actual resource, and a property type to which the data values pertain.

In one embodiment, database manager 140 stores data tables 240 so that each table forms a contiguous range of address locations in repository 180. Since a respective storage area network environment 100 can include many resources, each of which has many properties, the repository 180 can store a few very large tables (e.g., the resource type table 210, resource property table 220, resource instance table 230, and a respective table for each data value type) rather than many small tables. Storage of data in a few large database tables as discussed herein rather than many small database tables as in conventional methods improves search efficiency. Accordingly, managed object information can be identified and retrieved more quickly.

For example, each data value contains a foreign key (record identifier) to a corresponding property type in the property type table 220, which in turn has a foreign key to an entry in the resource type table 210. As discussed above, this links the property type to the object type to which it belongs. Each record in the resource instance table 230 has a foreign key to the resource type table 210 as well, basically closing the loop connecting the property value to the object instance. An additional foreign key in the resource property table 220 identifying the record in the resource instance table 230 is just a shortcut connecting the property value to the appropriate object instance, allowing faster execution of some common queries.

Storage of metadata and data in repository 180 can be viewed as a hierarchy. For example, a first level of the hierarchy includes the object definition table (e.g., resource type table 210). The second level of the hierarchy includes object properties definitions that link back to the appropriate object type in the resource type table 210. The third level of the hierarchy is an object instance table (e.g., resource instance table 230) describing associations between actual storage area network resources and corresponding resource types specified in the resource type table 210. The fourth level of the hierarchy includes data values. As discussed above, the data values have respective associations with level one, level two, and level three of the hierarchy.

Based on use of foreign keys, one or more foreign key values can be used to retrieve appropriate data values from repository 180. For example, a search can begin at level four (e.g., data tables 240).

One search can involve identification and/or retrieval of all resource instances of a certain type. Assume that the database manager 140 wants to identify all resource instances that are of a particular type (e.g., host type, switch type, etc.). In this example, the database manager 140 traverses the data tables 240 to identify any entries that include a foreign key in column 246 of a specified type.

Another search can involve identification and/or retrieval of object information associated with a particular resource such as "myObject" that is known to be a host resource. In this example, the database manager searches column 246 and column 244 of data tables 240 to identify entries that reference "myObject" in the resource instance table 230 and also reference HOST in the resource type table 210.

Another search can involve identification and/or retrieval of all object instances of the host object "myObject" where property disk free space >100 GB. In this example, the database manager 140 reads all property values from data tables 240 (e.g., level 4) for object type and object instances having property disk free space >100 GB.

According to data illustrated in FIG. 2, both objects "host" and "storage array" have properties "location" and "disk free space" in resource property table 220. However, they have different unique ID values. To identify all locations of the hosts, the database manager 140 specifies a search based on Host.location. A property type ID for location property of the object host is 100. Accordingly, a search begins by first identifying occurrences of 100 in column 248 of the data tables. To obtain all locations of storage arrays, the database manager 140 specifies "storage array".location. The property type ID for location property of the object "storage array" is 300. The database manager 140 then identifies all values where property_type_id=300.

Accordingly, based on use of unique ID values and use of foreign keys, the database manager 140 can use any combination of search parameters to directly access any information in repository 180.

Another search can involve identifying disk free space for host HOSTNAME1. A corresponding query is structured as "HostName1": Host("HostName1"). "disk free space". This search results in identification of all data values where object_id foreign key=10 in column 244 and property_type_id foreign key=200 in column 248.

As previously discussed, each of the data tables 240 can include different types of resource data that are each stored as contiguous blocks of data for simplified searching. For example, the database 140 can maintain a first data table (e.g., one of data tables 240) to store a first type of data associated with multiple different types of resources present in the storage area network environment 100. The database manager 140 stores the information in the first data table as a first contiguous block of searchable data. Additionally, the database manager 140 can maintain a second data table (e.g., one of data tables 240) to store a second type of data associated with multiple different types of resources present in the storage area network environment 100. The database manager 100 also stores the information in the second data table as a second contiguous block of searchable data.

Figure 3:
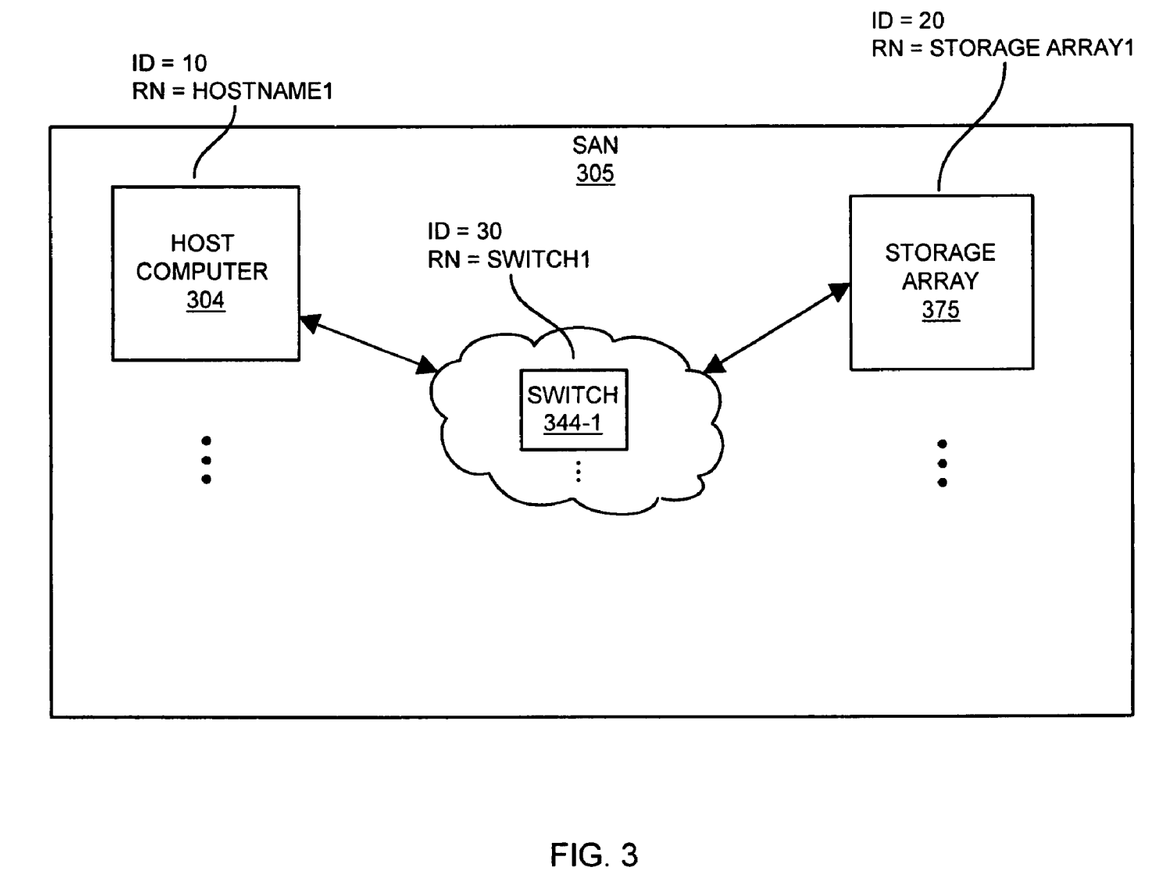
FIG. 3 is a diagram of a sample storage area network environment according to embodiments herein.

FIG. 3 is a more detailed diagram of a storage area network 305 according to embodiments herein. As shown, storage area network 305 includes a host computer 304, switch 344-1, and storage array 375. As indicated in FIG. 2, host computer 304 has an associated unique ID of 10 and resource name="HOSTNAME1," host switch 344-1 has an associated unique ID of 30 and resource name="SWITCH1," and storage array 375 has an associated unique ID of 20 and resource name="STORAGE ARRAY1."

Figure 4:
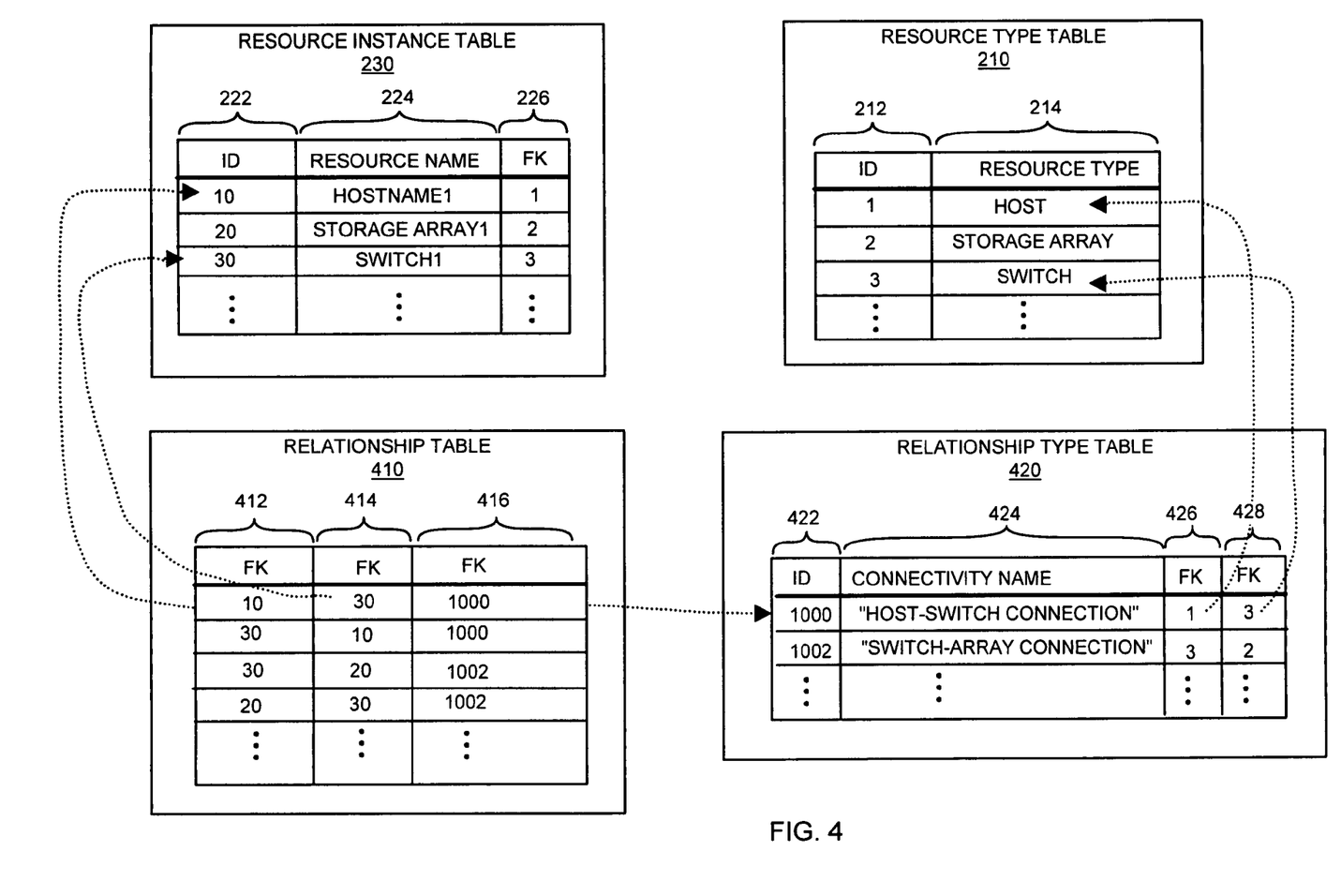
FIG. 4 is a block diagram illustrating use of database tables to define relationships of resources in a storage area network environment according to an embodiment herein.

FIG. 4 is a diagram including relationship table 410 and relationship type table 420 according to embodiments herein. As shown, relationship table 410 includes references to resource instance table 230 as well as relationship type table relationship type table 420.

For example, relationship table relationship table 410 includes column 412, column 414, and column 416. For each respective row of relationship table 410, a value in column 412 identifies a first foreign key identifying a respective resource in resource instance table 230, a value in column 414 identifies a second foreign key to another entry in resource instance table 230, and a third foreign key identifying an entry in relationship type table relationship type table 420. For a given entry, the foreign keys in column 412 and column 414 identify respective first and second resources that are related to each other. The foreign key in column 416 points to information identifying a relationship type associated with the first and second resources of the given entry. In other words, the foreign key in column 416 points to an entry in relationship type table 420 identifying further information associated with the relationship between a resource pair identified in columns 412 and 414.

Relationship type table 420 includes column 422 indicating a unique ID value for a respective relationship type, column 424 includes a string of information indicating a name associated with the relationship, column 426 includes a respective foreign key indicating the resource type associated with the first resource (as identified by the foreign key in column 412), and column 428 includes a respective foreign key indicating the resource type associated with the second resource (as identified by the foreign key in column 414).

In the present example, the first entry of relationship table 410 includes foreign keys 10 and 30. These two foreign keys identify specific resources (e.g., HOSTNAME1 and SWITCH1) in resource instance table 230. The corresponding foreign key in column 416 (e.g., foreign key=1000) identifies the first row of relationship type table 420 to identify corresponding relationship type information. For example, the foreign key in column 416 (for the first row) of relationship table 410 points to the first entry (labeled 1000) in relationship type table 420. Column 422 in resource type table 420 indicates that the unique ID value of 1000 corresponds to a HOST_SWITCH CONNECTION. For this entry, column 426 identifies (via foreign key=1) that the first resource (as specified by foreign key=10 in relationship table relationship table 410) is a HOST type resource. Column 428 identifies (via foreign key=3) that the second resource (as specified by foreign key=10 in relationship table relationship table 410) is a SWITCH type resource.

Use of relationship table 410 and relationship type table 420 enables the database manager 140 to identify different types of relationships associated with resources in the storage area network environment 100. Accordingly, the resources and/or corresponding resource information in storage area network environment 100 can be stored in repository 180 and represent a hierarchy as defined by relationship table 410 and relationship type table 420. Even though there are relatively few tables in repository 180, such tables serve purposes of storing data values for resources in the storage area network environment 100 as well as defining a hierarchy of information associated with the resources.

In certain cases, a given relationship is either uni-directional or bi-directional in nature. In the context of the present example of a bi-directional relationship, relationship table 410 includes a first record identifying a respective sequence of foreign keys 10, 30, 1000 as well as a second record identifying a respective sequence of foreign keys 30, 10, 1000. This provides an indication that the relationship between the resource as identified by foreign key=30 and the resource as identified by foreign key=10 is bi-directional in nature rather than uni-directional.

For a uni-directional relationship, relationship table 410 would include only a single pair of foreign keys without switching of the foreign key order from one entry to the next. For instance, if a respective relationship as identified by unique ID value=1000 were uni-directional, then the relationship table 410 would include only a single entry of foreign keys such as 30, 10, and 1000. In such an example, the relationship table 410 would not include a row of foreign keys including 10, 30, 1000. Based on this single entry of a pairing of foreign keys, there is a unidirectional relationship from SWITCH1 to HOSTNAME1.

Because a traversal by database manager 140 can involve reading only in a "left to right" direction, presence of a single resource pairing entry will not be mistaken as bi-directional relationship between HOSTNAME1 and SWITCH1. Nor will the entry be mistaken as a uni-directional relationship from HOSTNAME1 to SWITCH1.

Figure 5:
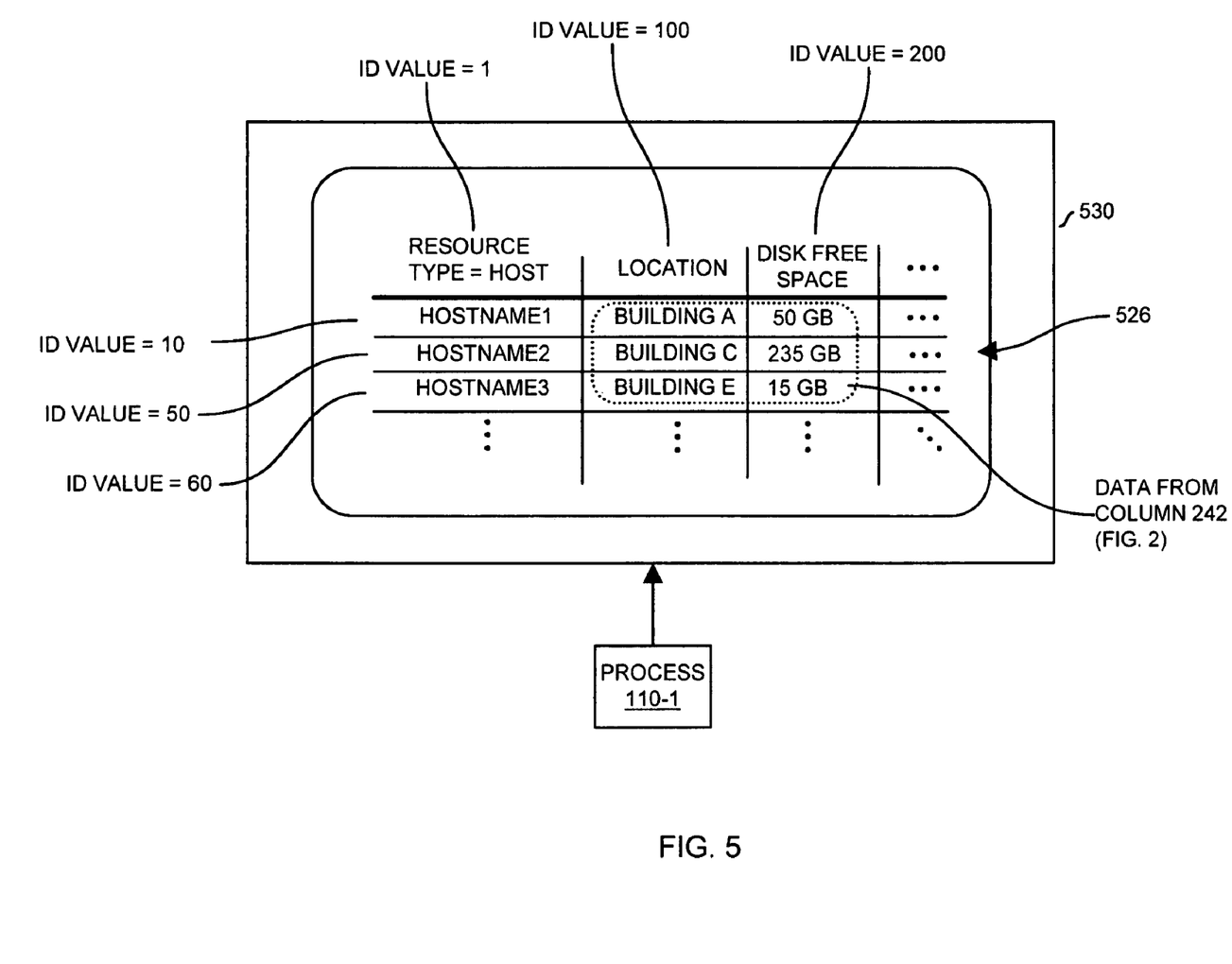
FIG. 5 is a diagram of information associated with a managed object retrieved from a database and presented to a user according to embodiments herein.

FIG. 5 is a diagram of information for viewing by a respective user according to embodiments herein. As shown, a respective user can request a viewing of information associated with storage area network environment 100. As previously discussed, the techniques and system described herein simplifies the routines (e.g., functions) that are used for maintaining information in repository 180.

Suppose that a user requests to view, in tabular form, all hosts present in storage area network environment 100 as well as corresponding attribute information associated with the hosts (e.g., resources having a unique ID=1). In response to receiving such a request, the database manager 140 can easily retrieve the appropriate information in tables of repository 180 based on use of foreign keys. For example, the database manager 140 searches the data tables for any rows in data tables 240 that include a foreign key to host type resources (e.g., any resources having a unique ID value=1).

Based on other foreign keys in a set of entries including a foreign key=1, the database manager can easily create table 510 for viewing by a respective user. For example, the other foreign keys (in column 244) of the set of entries (e.g., entries in data tables 240 including a foreign key=1) indicate corresponding unique names of all resources of the type HOST in resource instance table 230. The process 110-1 displays these names in the first column of table 526 under resource type=HOST. Another portion of the other foreign keys (in column 248) in the set of entries (e.g., entries in data tables 240 including a foreign key=1) indicate corresponding property types in resource property table 220 associated with HOST resources. Process 110-1 uses this property type information to create a corresponding number of columns in table 526. The names of property types are displayed as column headings. Process 110-1 populates table 526 to include data values in column 242.

This same logical process can be used to create and populate any type of information table regardless of the query. Of course, a number of columns and rows of a respective resource information table vary depending on the type of information that is requested for viewing. For example, process 110-1 creates the table 526 to include a number of columns depending on how many attributes are associated with the resource being viewed. Process 110-1 creates the table 526 to include a number of rows depending on how many resources of a specified type are present in the storage area network environment 100.

Thus, storage of resource information in repository 180 as discussed herein simplifies code that is required to create and display object information to a user. That is, a common software function can be used to create a different sizes of respective table for each of different types of resources depending on the type of attribute information associated with a given resource as identified by the tables in repository 180.

In one embodiment, database manager 140 i) receives queries for collection of information stored in the tables of the relational database; ii) utilizes references (e.g., foreign keys) in the tables to identify and retrieve record information that satisfy the queries; and iii) forwards the retrieved record information to a display manager that populates a display medium with the retrieved record information to produce table 526.

Figure 6:
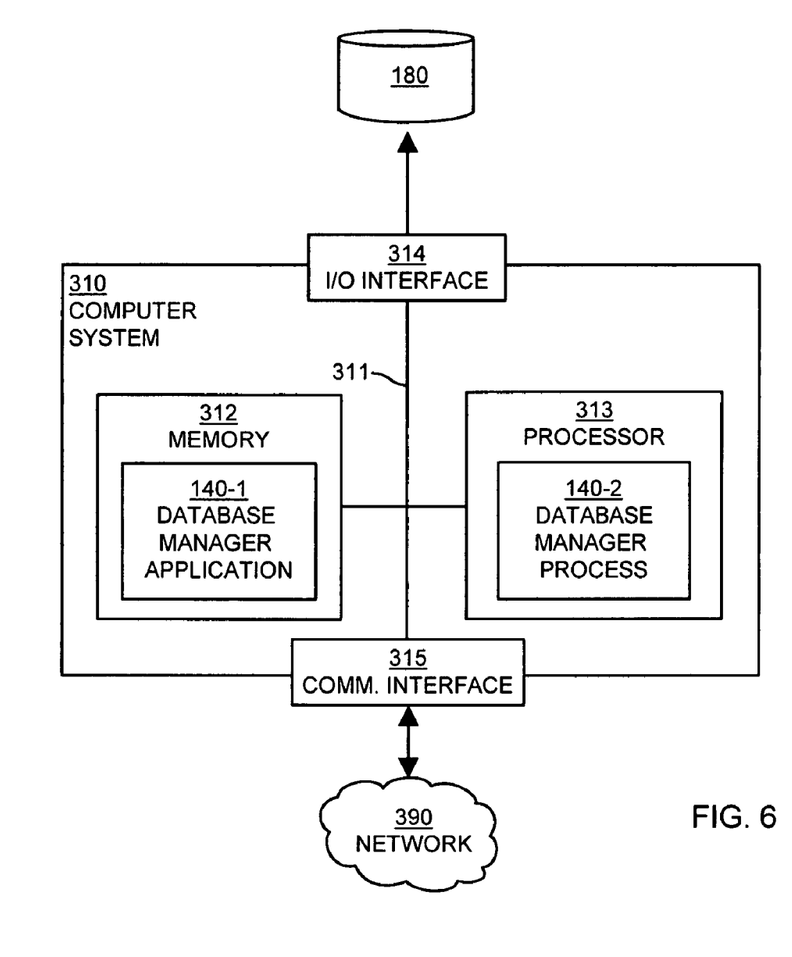
FIG. 6 is a diagram of a sample architecture for carrying out different processes according to embodiments herein.

FIG. 6 is a block diagram illustrating an example computer system 310 for executing database manager 140 and other processes according to embodiments herein. Computer system 310 may be a computerized device such as a personal computer, workstation, portable computing device, console, network terminal, processing device, etc.

As shown, computer system 310 of the present example includes an interconnect 311 that couples a memory system 312, a processor 313, an I/O interface 314, and a communications interface 315. Computer system 310 accesses repository 180 through I/O interface 314. Communications interface 315 of computer system 310 enables computer system 310 to communicate over network 390 to transmit and receive information from different resources.

As shown, memory system 312 is encoded with database manager application 140-1 supporting use and maintenance of repository 180 as discussed herein. Database manager application 140-1 can be embodied as software code such as data and/or logic instructions (e.g., code stored in the memory or on another computer readable medium such as a disk) that support functionality according to different embodiments described herein.

During operation of database manager application 140-1, processor 313 accesses memory system 312 via the interconnect 311 in order to launch, run, execute, interpret or otherwise perform the logic instructions of the database manager application 140-1. Execution of database manager application 140-1 produces processing functionality in database manager process 140-2. In other words, the database manager process 140-2 represents one or more portions of the database manager application 140-1 (or the entire application) performing within or upon the processor 313 in the computer system 310.

It should be noted that database manager 140 (also in FIG. 1) executed in computer system 310 can be represented by either one or both of the database manager application 140-1 and/or the database manager process 140-2. For purposes of this discussion and different embodiments herein, general reference will again be made to the database manager 140 as performing or supporting the various steps and functional operations as previously discussed and as will be discussed further in this specification.

It should be noted that, in addition to the database manager process 140-2, embodiments herein include the database manager application 140-1 itself (i.e., the un-executed or non-performing logic instructions and/or data). The database manager application 140-1 may be stored on a computer readable medium such as a floppy disk, hard disk, or optical medium. The database manager application 140-1 may also be stored in a memory type system such as in firmware, read only memory (ROM), or, as in this example, as executable code within the memory system 312 (e.g., within Random Access Memory or RAM). In addition to these embodiments, it should also be noted that other embodiments herein include the execution of database manager application 140-1 in processor 313 as the database manager process 140-2. Thus, those skilled in the art will understand that the computer system 310 may include other processes and/or software and hardware components, such as an operating system that controls allocation and use of hardware resources.

Functionality supported by database manager 140 will now be discussed via flowcharts in FIG. 7-9.

Figure 7:
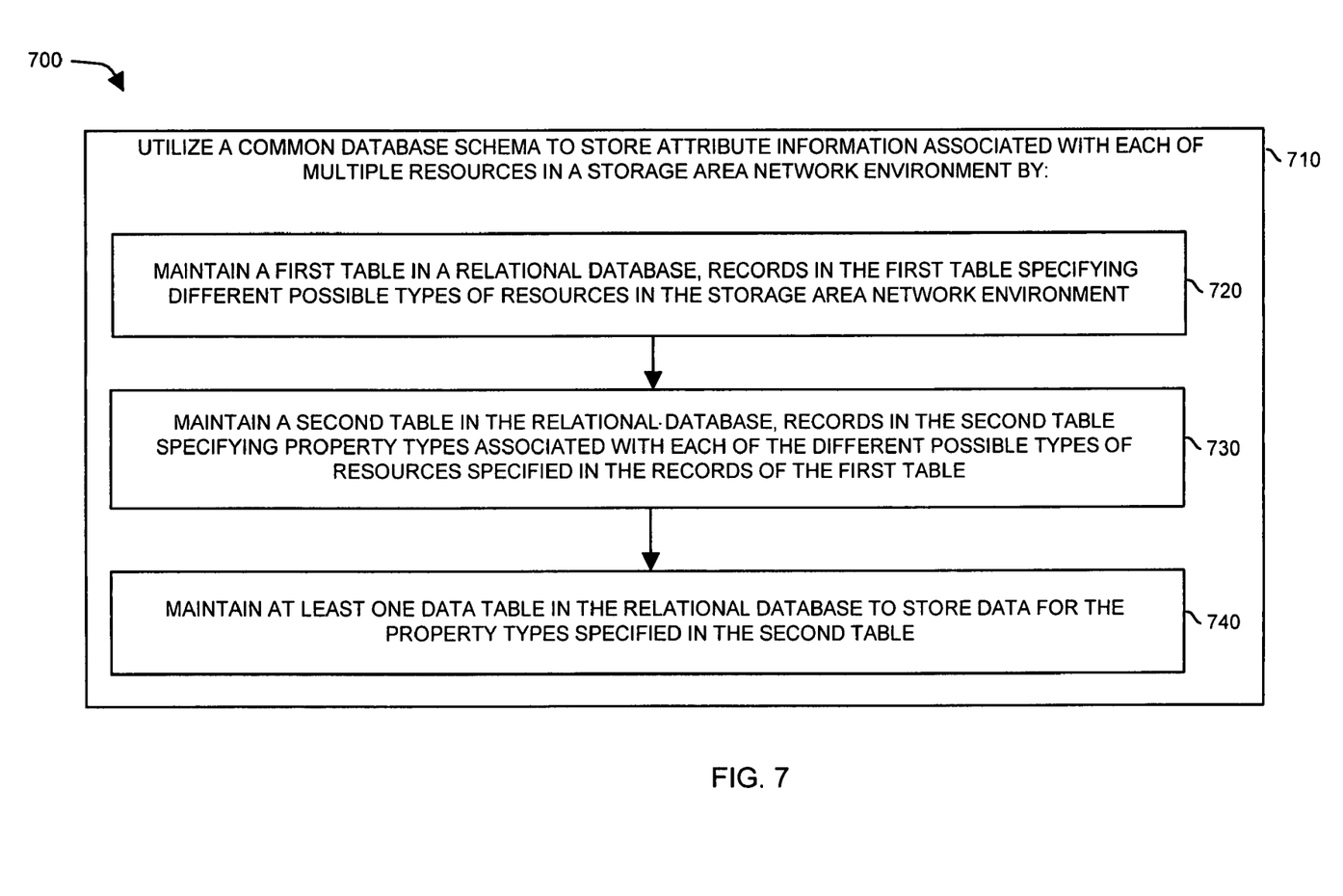
FIG. 7 is a flowchart illustrating utilization of a common database schema to store attribute information associated with each of multiple different types of resources present in a storage area network environment according to embodiments herein.

Now, more particularly, FIG. 7 is a flowchart 700 illustrating a technique of maintaining information associated with a respective storage area network environment according to an embodiment herein. Note that techniques discussed in flowchart 700 overlap with the techniques discussed above.

In step 710, the database manager 140 utilizes a common database schema to store attribute information associated with each of multiple resources in a storage area network environment.

In sub-step 720, the database manager 140 maintains resource type table 210 in repository 180 (e.g., a relational database). The records in the resource type table 210 specify different possible types of resources in the storage area network environment 100.

In sub-step 730, the database manager 140 maintains a resource property table 220 in repository 180. The records in the resource property table 220 specify different property types associated with each of the different possible types of resources specified in the records of the resource type table 210.

In sub-step 740, the database manager 140 maintains at least one data table 240 in repository 180 to store data for the property types specified in the resource property table 220.

Figure 8:
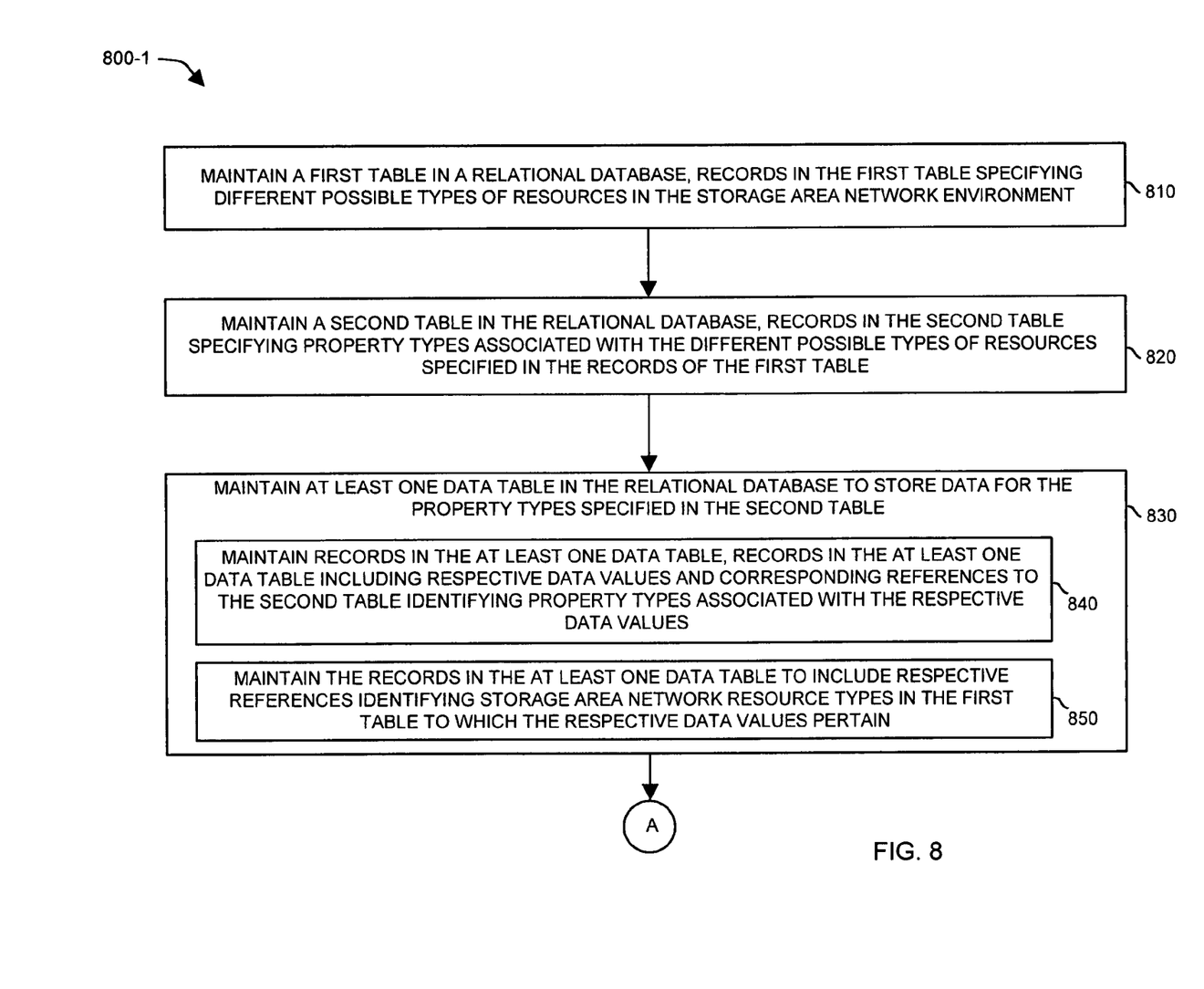
FIGS. 8 and 9 combine to form a more detailed flowchart illustrating techniques of maintaining a database according to embodiments herein.
Figure 9:
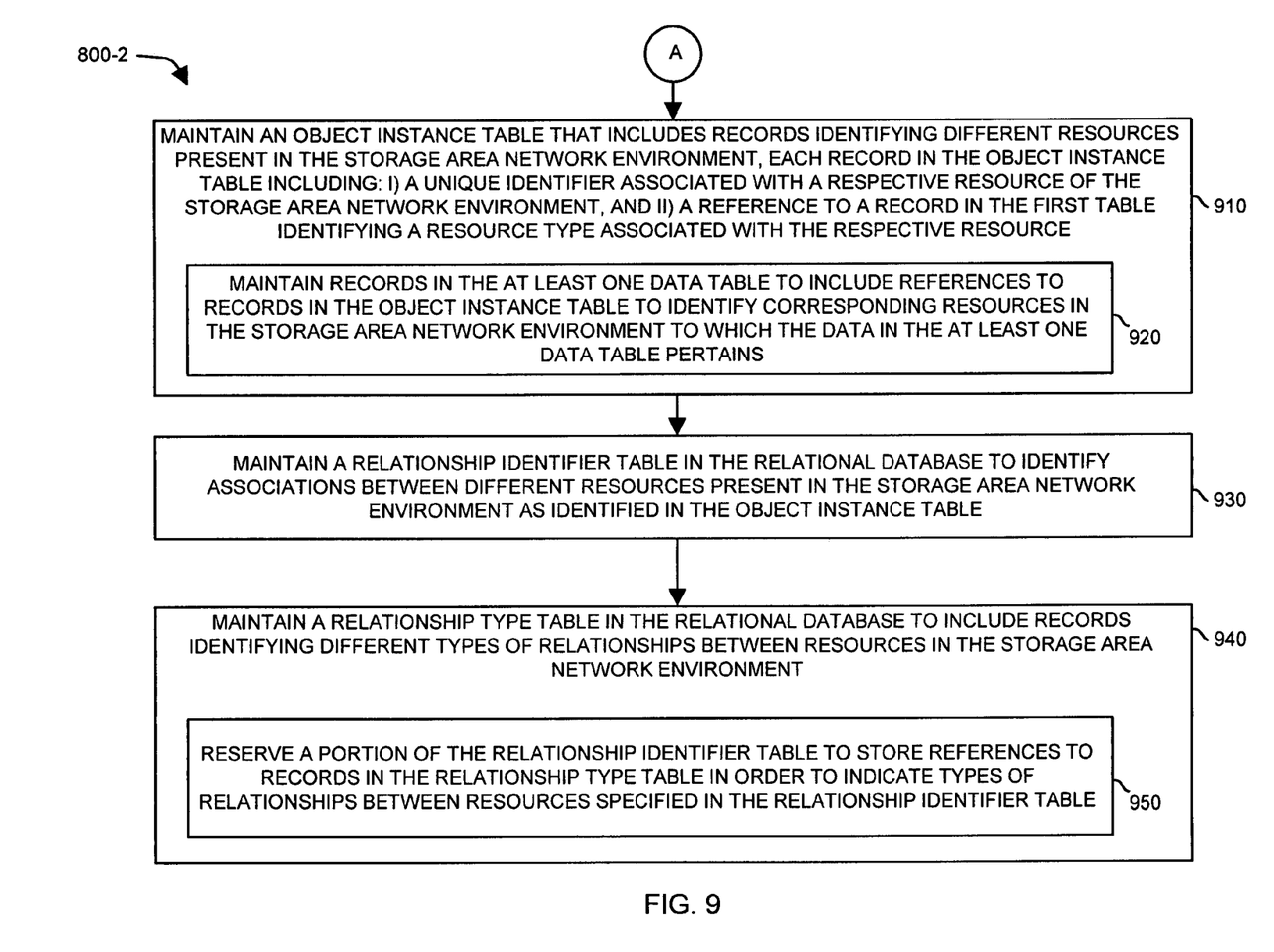

FIGS. 8 and 9 combine to form a more detailed flowchart 800 (e.g., flowchart 800-1 and flowchart 800-2) illustrating techniques for maintaining information associated with a respective storage area network environment according to an embodiment herein. Note that techniques discussed in flowchart 800 overlap with the techniques discussed above in the previous figures.

In step 810 of flowchart 800-1, the database manager 140 maintains a resource type table 210 having records specifying different possible types of resources in the storage area network environment 100.

In step 820, the database manager 140 maintains a resource property table 220 including respective records that specify property types associated with the different possible types of resources specified in the records of the resource type table 210.

In step 830, the database manager 140 maintains at least one data table 240 to store data for the property types specified in the resource property table 220.

In step 840, the database manager 140 maintains records in the at least one data table for storing data values and corresponding references to the resource property table 220. The references are foreign keys identifying property types associated with the respective data values in the data tables 240.

In step 850, the database manager 140 maintains the records in the at least one data table 240 to include respective references identifying storage area network resource types in the resource type table 210 to which the respective data values pertain.

In step 910 of FIG. 9, the database manager 140 maintains a resource instance table 230 (e.g., an object instance table) that includes records identifying different actual resources present in the storage area network environment 100. Each record in the rule identifier 230 includes: i) a unique identifier (e.g., ID value in column 232) associated with a respective resource of the storage area network environment 100, and ii) a reference (e.g., foreign key in column 236) to a record in the resource type table 210.

In step 920, the database manager 140 maintains records in the at least one data table 240 to include references (e.g., foreign keys) to records in the resource instance table 230 in order to identify corresponding resources in the storage area network environment 100 to which the data in the at least one data table 240 pertains.

In step 930, the database manager 140 maintains a relationship identifier table (e.g., relationship table relationship table 410) in repository 180 to identify associations between different resources present in the storage area network environment as identified in the resource instance table 230.

In step 940, the database manager 140 maintains a relationship type table relationship type table relationship type table 420. The relationship type table 420 includes records identifying different possible types of relationships between resources in the storage area network environment 100.

In step 950, the database manager 140 reserves a portion of the relationship table relationship table 410 to store references (e.g., foreign keys) to records of the relationship type table 420 in order to indicate types of relationships between resources specified in the relationship table 410.

As discussed above, techniques herein are well suited for use in environments supporting notification of changes to objects or object hierarchies having respective object data stored in a relational database. One such application for applying these techniques is a storage area network environment. However, it should be noted that embodiments herein are not limited to use in such applications.

While this invention has been particularly shown and described with references to preferred embodiments thereof, it will be understood by those skilled in the art that various changes in form and details may be made therein without departing from the spirit and scope of the present application as defined by the appended claims. Such variations are covered by the scope of this present application. As such, the foregoing description of embodiments of the present application is not intended to be limiting. Rather, any limitations to the invention are presented in the following claims.

We claim:

1. A computer-implemented method in which at least one computer system accesses instructions from storage, the computer-implemented method comprising:

utilizing a common database schema to store attribute information associated with each of multiple resources in a storage area network environment by:
populating a first table in a relational database, records in the first table specifying different possible types of resources in the storage area network environment;
populating a second table in the relational database, records in the second table specifying property types associated with each of the different possible types of resources specified in the records of the first table; and
populating at least one data table in the relational database to store data for the property types specified in the second table;

populating records in the at least one data table, records in the at least one data table including respective data values and corresponding references to the second table identifying property types associated with the respective data values; and wherein populating the records in the at least one data table includes populating the records in the at least one data table to include respective references identifying storage area network resource types in the first table to which the respective data values pertain, the method further comprising:

populating an object instance table that includes records identifying different resources present in the storage area network environment, each record in the object instance table including: i) a unique identifier associated with a respective resource of the storage area network environment, and ii) a reference to a record in the first table identifying a resource type associated with the respective resource;

wherein populating the records in the at least one data table includes populating records in the at least one data table to include references to records in the object instance table to identify corresponding resources in the storage area network environment to which the data in the at least one data table pertains;

populating the second table to include at least one record specifying a property type that is associated with a first resource type in the first table but is not associated with a second resource type in the first table; and populating the second table to include at least one record specifying a property type that is associated with a second resource type in the first table but is not associated with the first resource type in the first table.

2. A computer-implemented method as in claim 1, wherein populating the first table, the second table, and the at least one data table supports utilization of a common physical schema for populating a respective set of attributes associated with each of multiple different types of storage area network resources present in the storage area network environment.

3. A computer-implemented method as in claim 1 further comprising:
  populating the first table to include:
    i) a first identifier representing a first type of storage area network resource, and
    ii) a second identifier representing a second type of storage area network resource;
  populating the second table to include:
    i) a first record specifying a first property type associated with the first storage area network resource,
    ii) a second record specifying a second property type associated with the first storage area network resource,
    iii) a third record specifying a first property type associated with the second storage area network resource, and
    iv) a fourth record specifying a second property type associated with the second storage area network resource.

4. A computer-implemented method as in claim 1 further comprising:
  implementing a database management process to:
    i) receive queries for collection of information stored in the tables of the relational database;
    ii) utilize references in the tables to identify and retrieve record information that satisfy the queries; and
    iii) forward the retrieved record information to a display manager application that populates a display medium with the retrieved record information.

5. A method as in claim 1, populating the at least one data table includes:
  populating a first data table to store a first type of data associated with multiple different types of resources present in the storage area network environment;
  storing the information in the first data table as a first contiguous block of searchable data in the database;
  populating a second data table to store a second type of data associated with the multiple different types of resources present in the storage area network environment; and
  storing the information in the second data table as a second contiguous block of searchable data in the database.

6. A method as in claim 1 further comprising:
  populating a relationship identifier table in the relational database to identify associations between different resources present in the storage area network environment, the different resources being of the possible types as identified in the records of the first table.

7. A method as in claim 6 further comprising:
  populating a relationship type table in the relational database to include records identifying different types of relationships between resources in the storage area network environment; and
  wherein populating the relationship identifier table includes reserving a portion of the relationship identifier table to store references to records in the relationship type table in order to indicate types of relationships between resources specified in the relationship identifier table.

8. A computer system comprising:
  a processor;
  a memory unit that stores instructions associated with an application executed by the processor; and
  an interconnect coupling the processor and the memory unit, enabling the computer system to execute the application and perform operations of:
    populating a first table in a relational database, records in the first table specifying different possible types of resources in a storage area network environment;
    populating a second table in the relational database, records in the second table specifying property types associated with each of the different possible types of resources specified in the records of the first table;
    populating at least one data table in the relational database to store data for the property types specified in the second table;
    utilizing the first table, the second table, and the at least one data table to support a common database schema for storage of attribute information associated with each of multiple types of resources in the storage area network environment;
    populating records in the at least one data table, records in the at least one data table including respective data values and corresponding references to the second table identifying property types associated with the respective data values; and
  wherein populating the records in the at least one data table includes populating the records in the at least one data table to include respective references identifying storage area network resource types in the first table to which the respective data values pertain;
  populating an object instance table that includes records identifying different resources present in the storage area network environment, each record in the object instance table including: i) a unique identifier associated with a respective resource of the storage area network environment, and ii) a reference to a record in the first table identifying a resource type associated with the respective resource;
  wherein populating the records in the at least one data table includes populating records in the at least one data table to include references to records in the object instance table to identify corresponding resources in the storage area network environment to which the data in the at least one data table pertains;
  populating the second table to include at least one record specifying a property type that is associated with a first resource type in the first table but is not associated with a second resource type in the first table; and
  populating the second table to include at least one record specifying a property type that is associated with a second resource type in the first table but is not associated with the first resource type in the first table.

9. A computer program product including a computer-readable medium having instructions stored thereon for processing data information, such that the instructions, when carried out by a processing device, enable the processing device to perform the steps of:
  populating a first table in a relational database, records in the first table specifying different possible types of resources in the storage area network environment;
  populating a second table in the relational database, records in the second table specifying property types associated with each of the different possible types of resources specified in the records of the first table; and
  populating at least one data table in the relational database to store data for the property types specified in the second table;
  utilizing the first table, the second table, and the at least one data table to support a common database schema for storage of attribute information associated with each of multiple types of resources in the storage area network environment;

populating records in the at least one data table, records in the at least one data table including respective data values and corresponding references to the second table identifying property types associated with the respective data values; and wherein populating the records in the at least one data table includes populating the records in the at least one data table to include respective references identifying storage area network resource types in the first table to which the respective data values pertain.

10. The method as in claim 1 further comprising:
populating the second table to include different property types for the resource types specified in the first table.

11. The method as in claim 1 further comprising:
populating the second table to include multiple different resource property types associated with the first resource type in the first table; and populating the second table to include multiple different resource property types associated with the second resource type in the first table.

12. The method as in claim 1 further comprising:
populating given data in the at least one data table; and
populating the at least one data table to include a first reference and a second reference associated with the given data, the first reference specifying a resource type in the first table, the second reference specifying a property type in the second table, the property type as specified by the second reference indicating a respective resource property associated with a resource type as specified by the first reference.

13. The method as in claim 1 further comprising:
populating the first table to include the first resource type, the second resource type, and a third resource type;
populating a relationship identifier table in the relational database, the relationship identifier table specifying relationship types for groupings of the different possible types of resources in the storage area network environment; and populating the relationship identifier table to include at least a first relationship type and a second relationship type, the first relationship type indicating a relationship type between the first resource type and the second resource type, the second relationship type indicating a relationship type between the second resource type with and third resource type.

14. The method as in claim 1 further comprising:
receiving a request for given data stored in the at least one data table;
accessing a record in the at least one data table, the record including the given data, a first reference, and a second reference;
utilizing the first reference to access the first table and identify a resource type to which the given data pertains; and
utilizing the second reference to access the second table and identify a resource property type to which the given data pertains.

\* \* \* \* \*